United States Patent
Martins et al.

(10) Patent No.: US 7,255,130 B2
(45) Date of Patent: Aug. 14, 2007

(54) CONTROL VALVE FOR AN ENGINE COOLING CIRCUIT

(75) Inventors: Carlos Martins, Le Chesnay (FR); Mathieu Chanfreau, Saulx Marchais (FR)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 11/287,613

(22) Filed: Nov. 28, 2005

(65) Prior Publication Data

US 2006/0070672 A1    Apr. 6, 2006

(51) Int. Cl.
*F16K 11/085* (2006.01)

(52) U.S. Cl. ............... 137/625.46; 123/41.08; 251/309

(58) Field of Classification Search ........... 137/625.46, 137/625.47; 251/304, 309, 310; 123/41.08, 123/41.09, 41.1
See application file for complete search history.

(56) References Cited

U.S. PATENT DOCUMENTS

| | | | |
|---|---|---|---|
| 2,383,983 A * | 9/1945 | Melichar ............... 137/625.11 |
| 3,433,261 A * | 3/1969 | Fox ............................. 137/883 |
| 4,506,697 A | 3/1985 | Marchant |
| 4,836,250 A * | 6/1989 | Krambrock ............ 137/625.47 |
| 5,988,220 A * | 11/1999 | Sakaki .................. 137/625.47 |
| 6,345,645 B1 * | 2/2002 | Kenna et al. .......... 137/625.11 |

FOREIGN PATENT DOCUMENTS

| | | |
|---|---|---|
| DE | 31 33 633 | 3/1983 |
| EP | 0 449 459 A | 11/2001 |
| WO | WO01/40687 A1 | 11/2000 |

* cited by examiner

*Primary Examiner*—John Fox
(74) *Attorney, Agent, or Firm*—Ronald Courtney (57) ABSTRACT

A control valve (10) for a fluid circulation circuit comprises a body (12) which is equipped with a fluid inlet (18) and at least two fluid outlets (20, 22 and 24) and which delimits a cylindrical housing for an adjusting member (26) able to rotate about an axis of rotation (XX) and to adopt various angular positions in order to control the distribution of fluid through the outlets. The body (12) comprises an end wall (14) into which the fluid inlet (18) opens and a cylindrical side wall (16) into which the fluid outlets open at axial heights and at angular positions that are chosen with respect to the axis of rotation (XX). The rotary member (26) comprises a truncated end (38) facing toward the end wall (14), this making it possible to have control over the fluid outlets using a law defined as a function of the angular position of the rotary member in the valve body.

39 Claims, 11 Drawing Sheets

CONTROL VALVE FOR AN ENGINE COOLING CIRCUIT

The invention relates to a control valve for a fluid circulation circuit, and to a circuit equipped with such a valve.

It is aimed more specifically at providing a control valve intended for a motor vehicle engine cooling circuit.

Such a cooling circuit has, running through it, a coolant, usually water, to which an antifreeze is added, which flows in a closed circuit under the action of a circulation pump.

In general, such a cooling circuit comprises several branches, including a branch that contains a cooling radiator, a branch which constitutes a bypass of the cooling radiator and a branch which contains a radiator, also known as a "unit heater", that serves to heat the cabin.

It is known practice to employ a thermostatic valve which comprises a fluid inlet connected to the outlet of the engine and two fluid outlets which correspond respectively to the branch containing the cooling radiator and to the branch forming the bypass.

When the engine is started from cold, and as long as the temperature of the coolant has not reached a certain threshold level, the valve causes the coolant to circulate through the bypass branch, short circuiting the cooling radiator. As soon as the temperature of the coolant reaches and exceeds the aforementioned threshold level, the coolant passes through the cooling radiator and avoids the bypass branch.

In general, the coolant circulates constantly through the branch containing the heating radiator, the heating of the cabin then being obtained by mixing a stream of cold air and a stream of hot air which has swept across the heating radiator. It is also known practice to provide a separate valve on the heating radiator in order to adjust the flow rate of coolant passing through it.

In existing embodiments, use is made of control valves which allow independent control over the flow rate of coolant through the various branches of the cooling circuit of an engine, so as to optimize the engine temperature and the heating of the cabin. However, the control valves do not provide the valve-control system or the engine computer with information about the state of the cooling circuit and are unable to diagnose faults or breakdowns in the cooling circuit.

It is also known practice to apply sensors external to the valve in order to monitor the operation of the heat transfer fluid. However, installing such sensors is expensive, not very reliable, and also requires recourse to be made to several connectors in order to transmit the measured values to the computer of the vehicle and to the valve control system.

The valves in current cooling circuits are therefore not equipped to detect any malfunctioning and, if appropriate, to provide a diagnosis thereof, so that operation of the valves can be altered.

The invention aims to improve the situation.

To this end, it proposes a control valve comprising built-in sensors and intended for a fluid circulation circuit which, in a preferred embodiment of the invention, constitutes a motor vehicle engine cooling circuit and is equipped with built-in sensors to slave the position of the control valve according to at least one parameter characteristic of the state of the cooling circuit and measured by the sensors, and to diagnose any malfunctioning of the cooling circuit.

In this particular application, the invention is aimed at affording a valve which allows independent control of the flow rate of cooling fluid through the various branches of the engine cooling circuit, so as to optimize the engine temperature and the heating of the cabin.

The invention is thus more particularly aimed at a control valve for a fluid circulation circuit, comprising a body which is equipped with at least one fluid inlet and at least two fluid outlets, and which delimits a housing for an adjusting member able to rotate about an axis of rotation and to adopt various angular positions in order to control the distribution of fluid through the outlets.

According to one general definition of the invention, the body comprises an end wall into which the fluid inlet opens and a side wall into which the fluid outlets open, at axial heights and at angular positions that are chosen with respect to the axis of rotation, and the adjusting member comprises a shaped part for controlling the outlets of fluids with a law defined as a function of the angular position of the rotary member in the valve body.

In an advantageous embodiment, the body delimits a cylindrical housing for the adjusting member, the side wall is a cylindrical wall, and the shaped part is a truncated end facing toward the end wall.

It is thus possible to control the flow rate of fluid through the various outlets of the valve, and to do so as a function of the angular position given to the adjusting member of the valve.

In this way, it is possible to control the distribution of fluid in accordance with a predefined law.

Such a valve may thus equip a fluid circulation circuit, particularly a motor vehicle engine cooling circuit, to provide independent control over the flow rates of cooling fluid through the various branches of the circuit.

Advantageously, the truncated end comprises a generally flat face which, with the axis of rotation, forms a chosen angle of close to 45°.

In the valve of the invention, at least one of the fluid outlets may be a radial nozzle or alternatively a tangential nozzle.

In one particular application, the valve has three fluid outlets.

In one embodiment of the invention, the adjusting member is covered with a split ring made to rotate as one with it by a projecting lug that the adjusting member has.

In this case, the split ring is advantageously made of a material with a low coefficient of friction. Such a split ring advantageously has an outside diameter slightly greater than the inside diameter of the valve body prior to mounting and an inside diameter slightly greater than the diameter of the adjusting member after mounting.

It is advantageous for the split ring to cover a region of the adjusting member which is equipped with circular grooves. These grooves actually guarantee that the split ring is pressed firmly against the interior wall of the body, thus ensuring a good seal during operation.

As an alternative or as a supplement, the truncated end of the adjusting member may comprise a duct, having a chosen shape, advantageously the shape of an arc of a circle, making it possible to optimize the progressiveness of opening.

As an alternative or as a supplement, the adjusting member may be equipped with a sealing shoe, preferably mounted on a spring, making it possible to obtain sealing, particularly on the most critical branch of the circuit.

In another embodiment, the adjusting member comprises, at the opposite end to the truncated end, two roughly diametrically opposed cylindrical wall portions for controlling one of the fluid outlets. This is particularly suitable when this fluid outlet has a large cross section and avoids increasing the diameter of the valve body. This is beneficial when there is a desire to isolate a chosen branch of the circuit.

The control valve advantageously comprises drive means able to drive the adjusting member by means of a drive wheel forming part of a reduction gearbox for bringing it into chosen angular positions with respect to the valve body.

As a supplement, the valve comprises a microprocessor for operating the drive means.

According to another aspect of the invention, the adjusting member comprises at least one internal sensor for measuring values relating to the operation of the fluid circulation circuit.

In a first embodiment, the internal sensors are sensors that sense the presence of air in the circuit.

In a particular application, the adjusting member comprises a machined duct extending over the entire length of the adjusting member, to house the sensors.

Advantageously, a first end of the sensors passes through the lower end of the adjusting member facing toward the end wall, at a chosen point, so as to be in contact with the fluid.

In a second embodiment, the sensors are temperature sensors and the machined duct comprises a lower end made of brass, in contact with the fluid, in which to house the first end of the temperature sensors.

It is advantageous for the second end of the sensors to pass through the upper end of the valve toward the outside to transmit the values measured by the sensors.

As a supplement, the second end of the sensors is connected to information transmitting means for transmitting the values measured by the sensors to the microprocessor and/or to a computer.

In one embodiment, the information transmitting means comprise circular electrical-contact tracks.

In this embodiment, the information transmitting means may also comprise plugs connected to the circular tracks for transmitting the values originating from the sensors.

The circular tracks may be situated on a moving part of the valve whereas the plugs are situated on a fixed part of the valve.

As an alternative, the circular tracks may be situated on a fixed part of the valve whereas the plugs are situated on a moving part of the valve.

In particular, the moving part of the valve is the drive wheel of the drive means.

The control valve advantageously comprises a connector, connected to the information transmitting means of the valve to transmit the measured values to the microprocessor and/or to the computer.

According to another aspect, the invention relates to a fluid circulation circuit which comprises a control valve as defined hereinabove, the fluid inlet of which is connected to a fluid source and the fluid outlets of which are connected respectively to branches of the circuit.

In one preferred application, the circuit is produced in the form of a cooling circuit for cooling the engine of a motor vehicle, through which a coolant flows under the action of a circulation pump. In this application, the control valve is a three-way valve, the fluid inlet of which is connected to a coolant inlet originating from the engine, and the three fluid outlets of which are connected respectively to a first branch of the circuit which contains a cooling radiator, to a second branch of the circuit which constitutes a bypass of the cooling radiator, and to a third branch of the circuit which contains a unit heater for heating the cabin.

In the description which follows, given solely by way of example, reference is made to the attached drawings in which.

Reference is made first of all to FIGS. 1 to 8 which show a control valve 10 according to a first embodiment of the invention. This control valve comprises a cylindrical body 12 limited by an end wall 14 and a cylindrical side wall 16 of axis XX. A fluid inlet nozzle 18 opens axially into the end wall 14. Three fluid outlet nozzles 20, 22 and 24 open into the cylindrical side wall 16. These three outlet nozzles open at axial heights and at angular positions that are chosen with respect to the axis of rotation XX. In the example, the nozzles 20, 22 and 24 open radially into the wall 16. The nozzles 20 and 24 are diametrically opposed, while the nozzle 22 makes an angle of 90 degrees with respect to the common axis of the nozzles 20 and 24. Furthermore, the nozzles 20, 22 and 24 have successively decreasing diameters.

Housed inside the valve body 12 is an adjusting member 26, also known as the rotary member, which is produced in the form of a solid cylindrical element which may be made of plastic. The diameter of the cylindrical element more or less corresponds to the inside diameter of the valve body. The adjusting member 26 is continued by a stem 28 directed along the axis XX. This stem 28 passes through a central opening possessed by a cover 30 of circular shape screwed onto a flange 32 of the valve body by four fixing screws 34 with the interposition of a seal (not depicted). The adjusting member 26 is able to be driven in rotation about the axis XX by drive means 36 depicted schematically in FIG. 1. The drive means may for example consist of a motor of the stepping type able to bring the adjusting member 26 into a multitude of different positions, either in successive increments or continuously.

Figure 1:
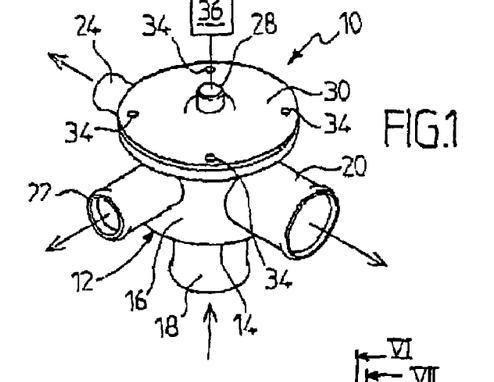
FIG. 1 is a perspective view of a control valve, of the three-way type, according to a first embodiment of the invention.
Figure 2:
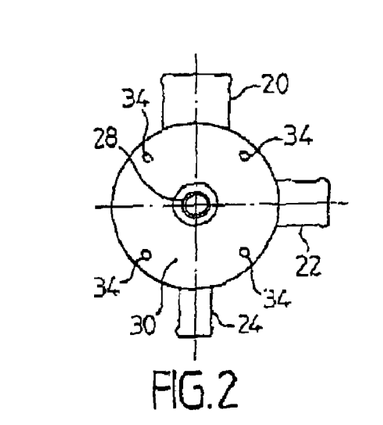
FIG. 2 is a view from above of the valve of FIG. 1.
Figure 3:
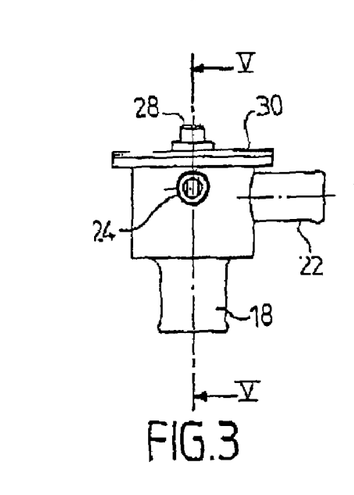
FIGS. 3 and 4 are side views of the valve of FIGS. 1 and 2.
Figure 4:
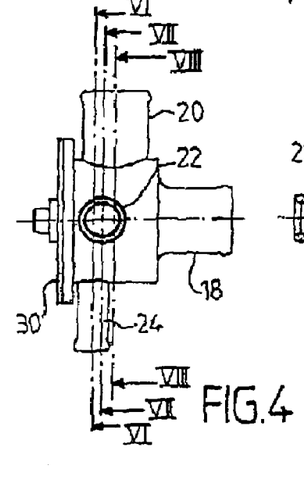
Figures 5, 8:
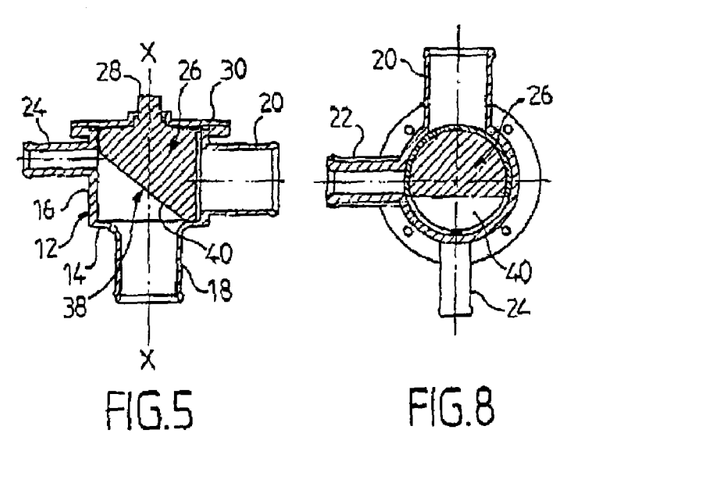
FIG. 5 is a view in section on V-V of FIG. 3.
FIGS. 6 to 8 are views in section on VI-VI, VII-VII and VIII-VIII of FIG. 4 respectively.
Figure 6:
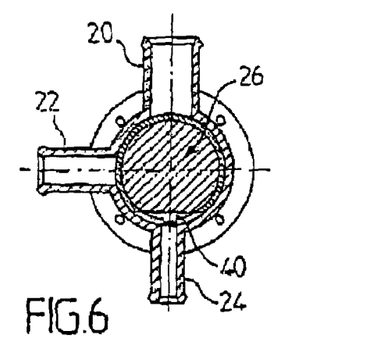
Figure 7:
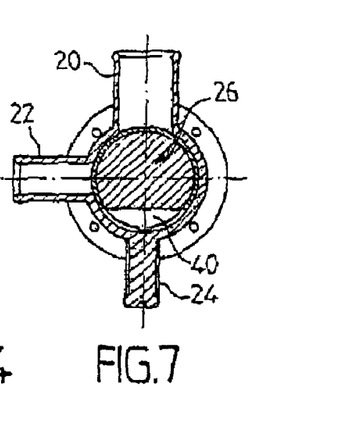

According to one essential feature of the invention, the adjusting member 26 comprises a truncated end 38 which faces toward the end wall 14 (as can be seen best in FIG. 5). In the example, this truncated end is formed of a generally flat face 40 which, with the axis of rotation XX, makes a chosen angle which, in the example, is close to 45 degrees.

In that way, the adjusting member 26 allows control over the fluid outlets 20, 22 and 24, with a law defined as a function of the angular position of said member in the valve body.

In the position depicted in FIGS. 5 to 8, the fluid which arrives through the inlet nozzle 18 can escape only through the outlet nozzle 24, the other outlet nozzles 20 and 22 being closed.

By subsequently altering the angular position of the adjusting member it is possible to adjust the flow rate of fluid through the various outlet nozzles 20, 22 and 24, and to do so progressively.

Figure 51:
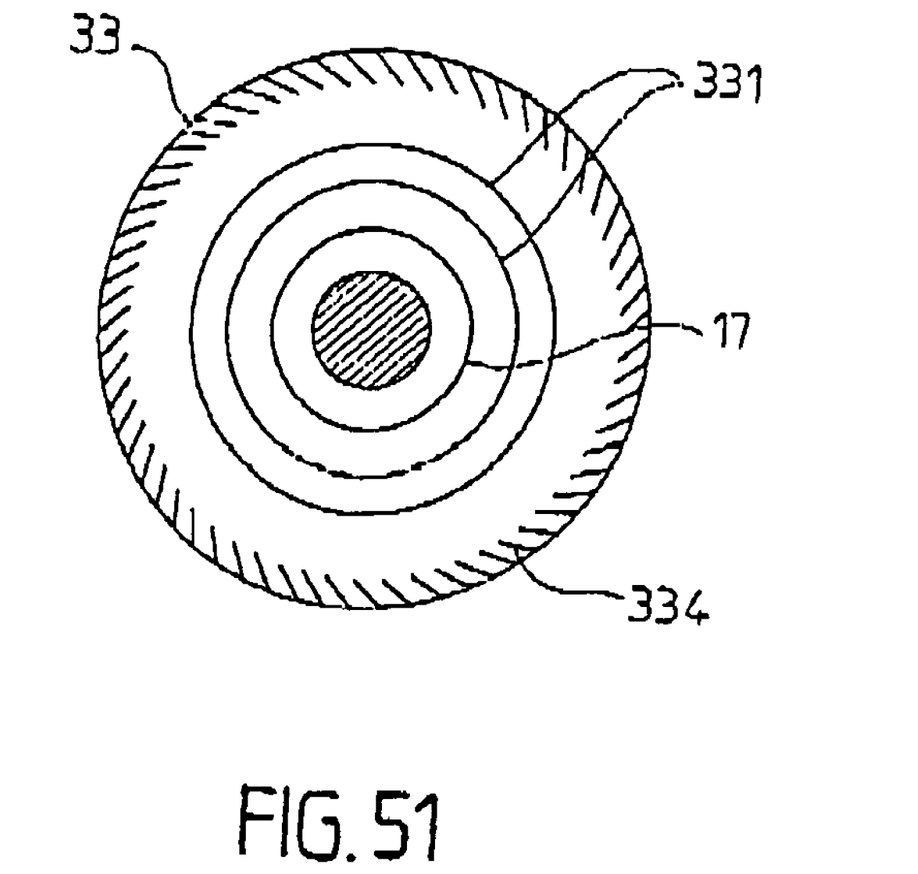
FIG. 51 depicts a drive wheel comprising circular electrical contact tracks.

The position of the adjusting member 26 is controlled by means of a position sensor 331 placed, for example, on the drive wheel 33 of the reduction gearbox 3 of the drive means 36 (FIG. 51). This sensor 331 may be a potentiometer with a circular contact track fixed directly to the drive wheel 33.

Figure 9:
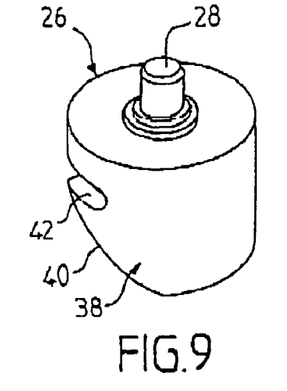
FIG. 9 is a perspective view of an adjusting member of a control valve, according to another embodiment of the invention, which is equipped with a duct.
Figure 10:
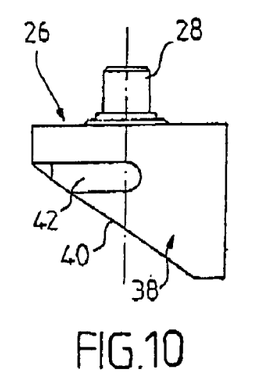
FIGS. 10 and 11 are two side views of the rotary member of FIG. 9.
Figure 11:
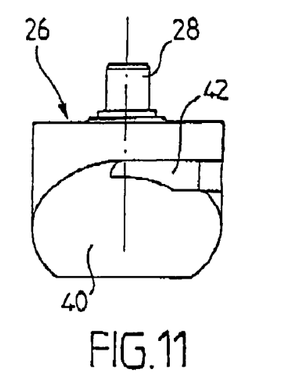
Figure 12:
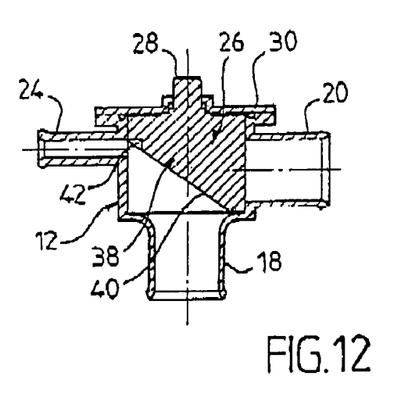
FIGS. 12 to 15 are views in section corresponding to FIGS. 5 to 8 respectively for a control valve equipped with a rotary member according to FIGS. 9 to 11.
Figure 13:
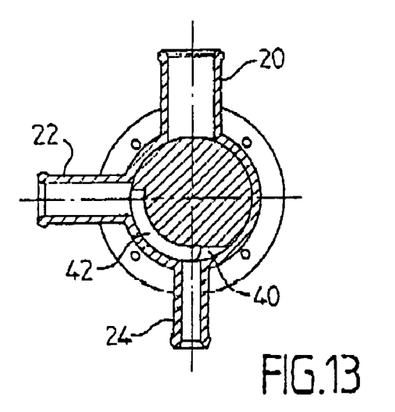
Figure 14:
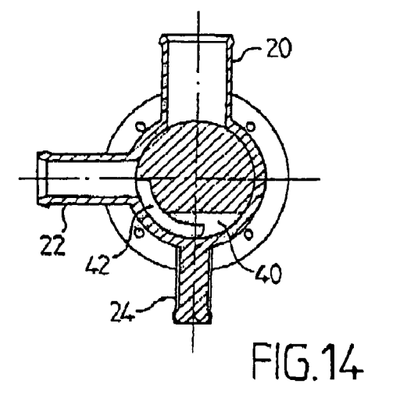
Figure 15:
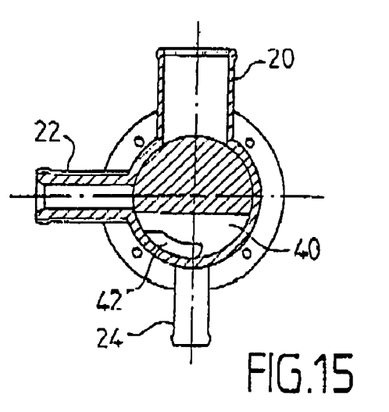

The adjusting member 26 depicted in FIGS. 9 to 11 is similar to that of the preceding embodiment except that the truncated end 38 has a duct 42 of chosen shape which, here, is more or less in the shape of an arc of a circle centered around the axis XX. This duct in the shape of an arc of a circle extends over roughly 90 degrees, as can be seen in FIGS. 12 to 15, which correspond to FIGS. 5 to 8 respectively of the preceding embodiment.

The presence of this duct makes it possible to achieve progressiveness in the opening of the valve over two ways of this valve, namely the outlet nozzles 22 and 24.

The position of the adjusting member 26 of FIGS. 12 to 15 corresponds to that of the adjusting member 26 of FIGS. 5 to 8. However, the presence of this duct means that a small fluid flow rate can escape through the outlet nozzle 22 even though this outlet nozzle is completely closed in the case of the preceding embodiment. By contrast, here again, the outlet nozzle 20 is closed by the adjusting member 26.

Figures 16, 17:
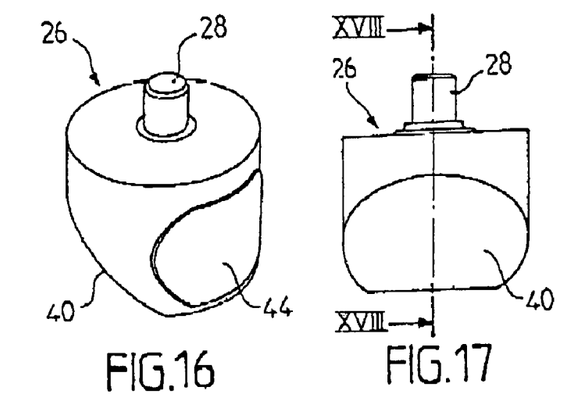
FIG. 16 is a perspective view of an adjusting member equipped with a sealing shoe.
FIG. 17 is a side view of the adjusting member of FIG. 16.
Figure 18:
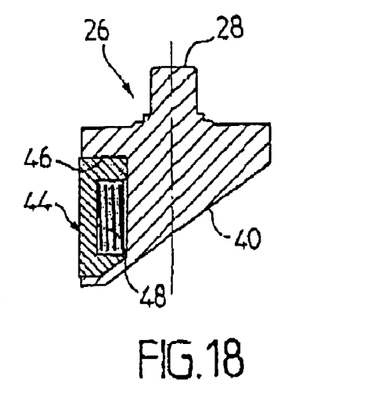
FIG. 18 is a view in section on XVIII-XVIII of FIG. 17.
Figure 19:
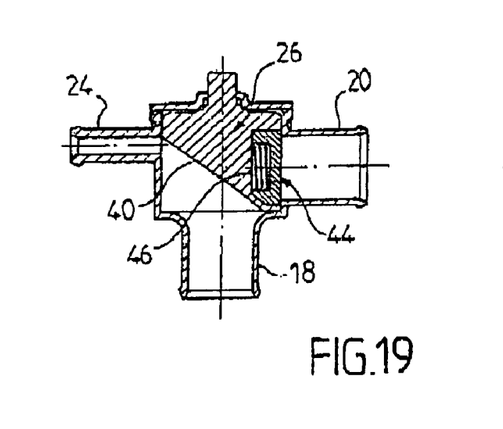
FIGS. 19 to 22 are various views in section, corresponding respectively to FIGS. 5 to 8, of a control valve equipped with an adjusting member according to FIGS. 16 to 18.
Figure 20:
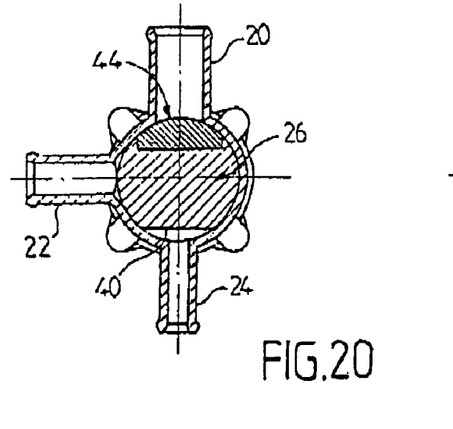
Figure 21:
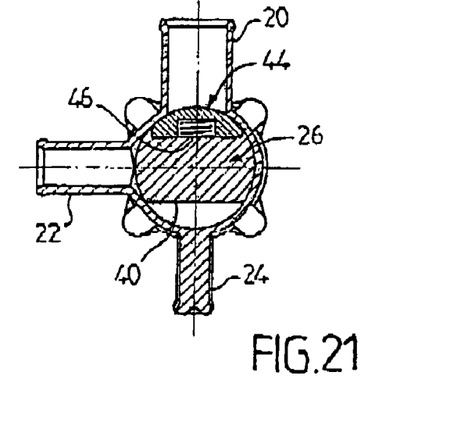
Figure 22:
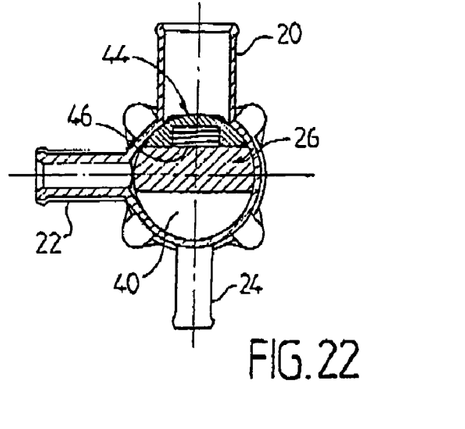
Figure 23:
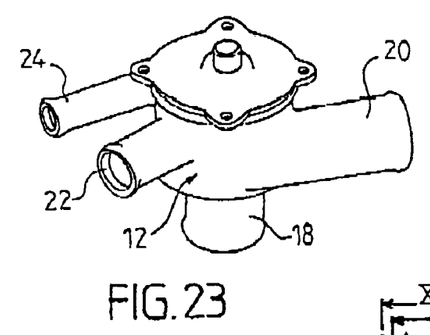
FIGS. 23 to 30 are various views, similar to FIGS. 1 to 9 respectively, of a control valve according to another embodiment.
Figure 24:
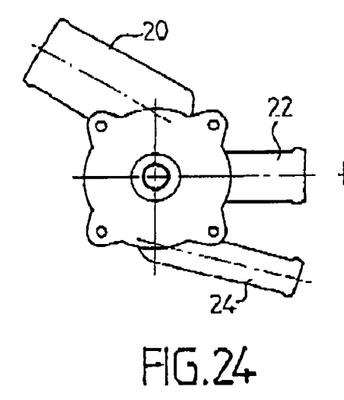
Figure 25:
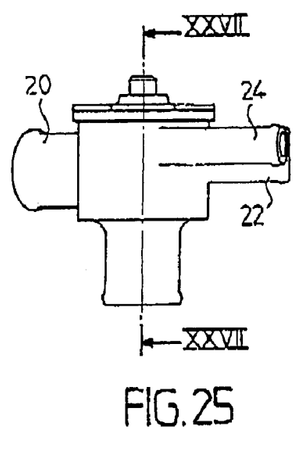
Figures 26, 29:
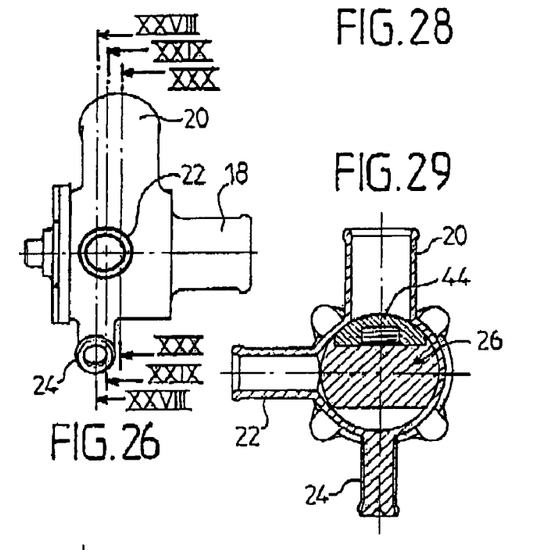
Figures 27, 30:
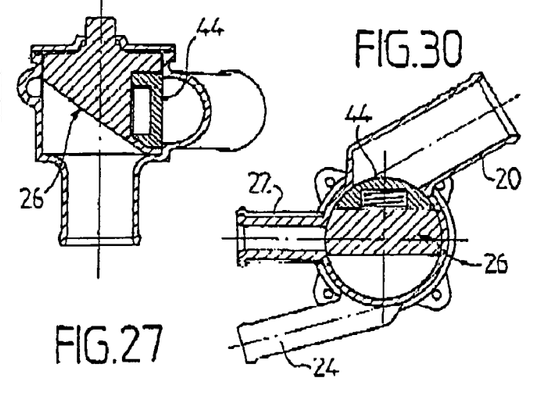
Figure 28:
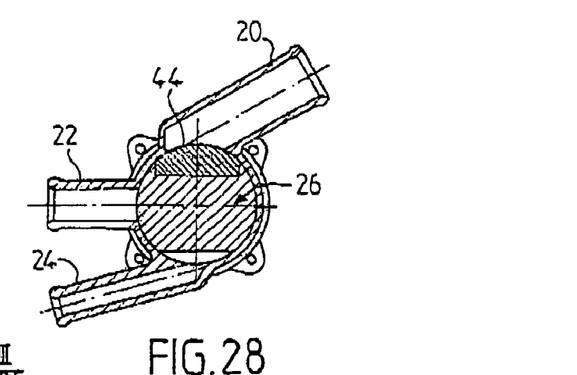

Reference is now made to FIGS. 16 to 18 which show an adjusting member 26 similar to that of the embodiment of FIGS. 1 to 8. The main difference lies in the fact that this member here is equipped with a sealing shoe 44 of cylindrical shape, housed in a housing 46 formed at the periphery of the rotary member and urged by a spring 48. This shoe provides sealing at the most critical part of the circuit. The presence of the spring provides compensation for the variations in expansion of the materials, because of the variations in temperature of the fluid passing through the valve.

In FIGS. 19 to 22 which can be likened respectively to FIGS. 5 to 8, the sealing shoe 44, in the positioned depicted, seals against the nozzle 20.

Reference is now made to FIGS. 23 to 30 which can be likened to FIGS. 1 to 8 respectively, the adjusting member 26 here being equipped with a shoe 44 as in the preceding embodiment. The main difference here lies in the fact that the nozzles 20 and 24 open tangentially into the valve body 12 whereas the nozzle 22 opens radially thereinto.

Figure 31:
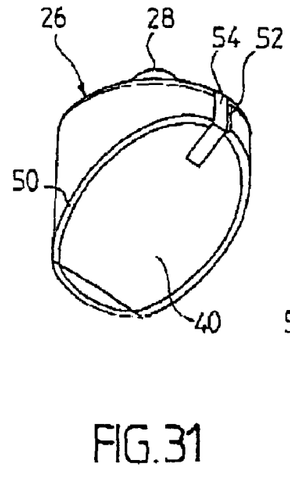
FIG. 31 is a perspective view of an adjusting member equipped with a split ring.
Figure 32:
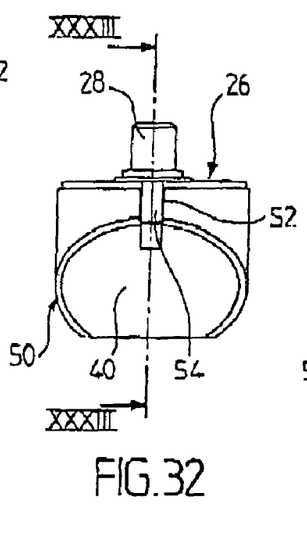
FIG. 32 is a side view corresponding to FIG. 31.
Figure 33:
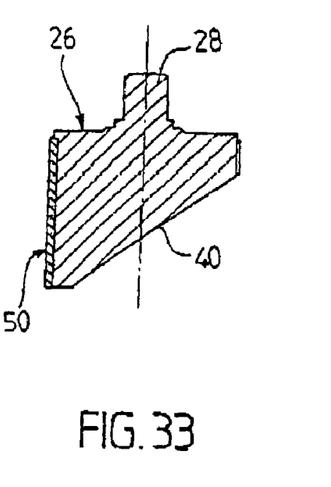
FIG. 33 is a view in section on XXXIII-XXXIII of FIG. 32.

Reference is now made to FIGS. 31 to 33 which show an adjusting member similar to that of FIGS. 1 to 8. The adjusting member is covered by a split ring 50 which comprises a slot 52 for the passage of a lug 54 formed radially projecting from the adjusting member. The result is that this split ring is made to rotate as one with the adjusting member 26. The split ring 50 is made of a material with a low coefficient of friction, for example Teflon® (polytetrafluoroethylene), PPA or PPS, with or without a surface coating.

Furthermore, this split ring has an outside diameter slightly greater than the inside diameter of the valve body prior to mounting and an inside diameter slightly greater than the diameter of the adjusting member after mounting. That makes it possible to guarantee sealed contact of the ring with the body, and for this to be the case without leading to an excessively high torque.

Figure 34:
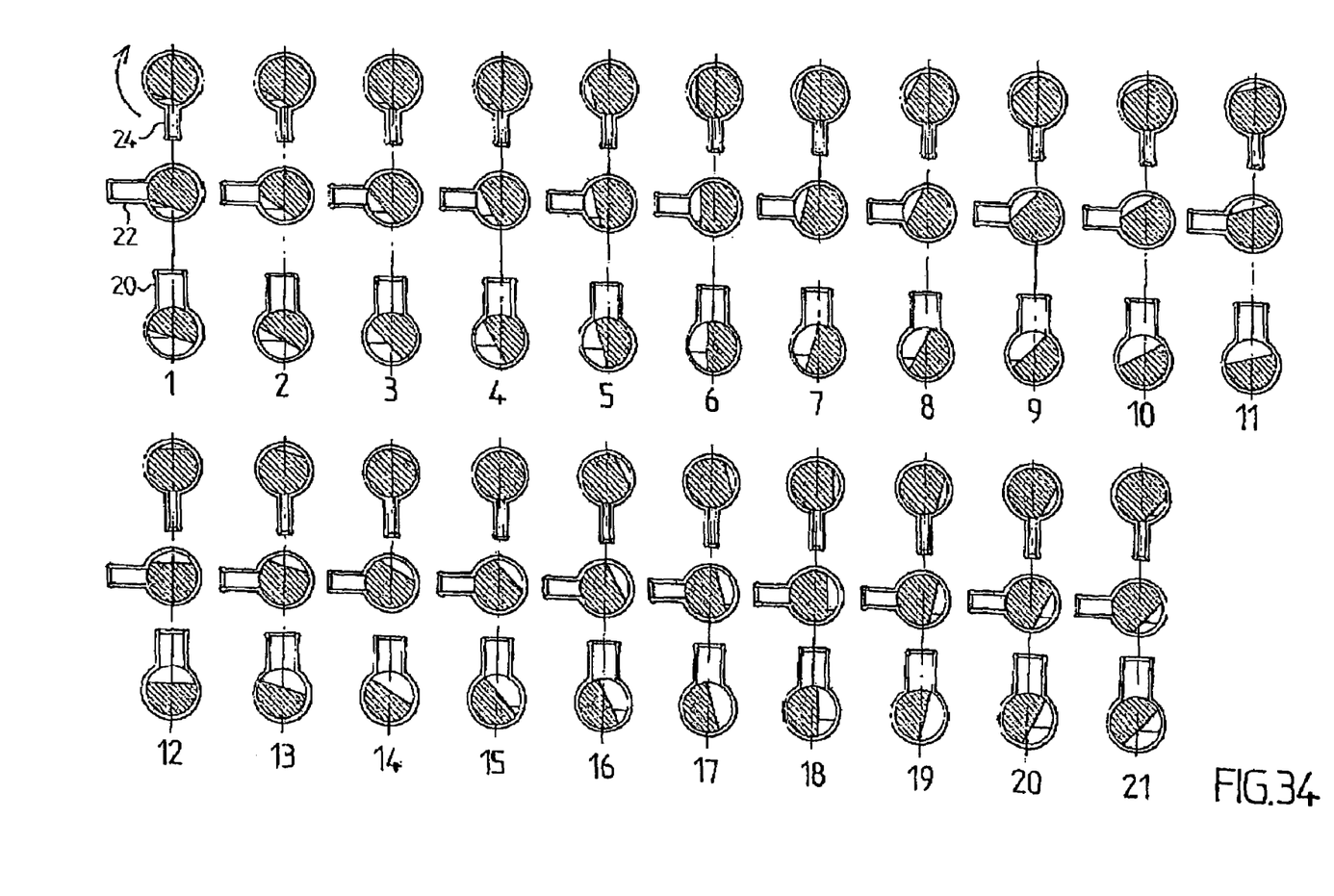
FIG. 34 shows, in each instance, three different sectional views of the valve for angular positions of the adjusting member, these being numbered from 1 to 21, which follow on from one another in 15-degree increments in the clockwise direction.

Reference is now made to FIG. 34 which shows various successive positions of the adjusting member, these being numbered from 1 to 21, each one respectively depicted at the three outlet nozzles 20, 22 and 24. In the example, these positions are obtained by successive rotations through 15 degrees, in the clockwise direction, of the adjusting member inside the valve body. It may thus be seen that the various outlet nozzles can be opened or closed in accordance with a defined law, and that this can be done progressively.

These various positions are obtained by the drive means 36 which are operated by an appropriate control circuit.

Figure 35:
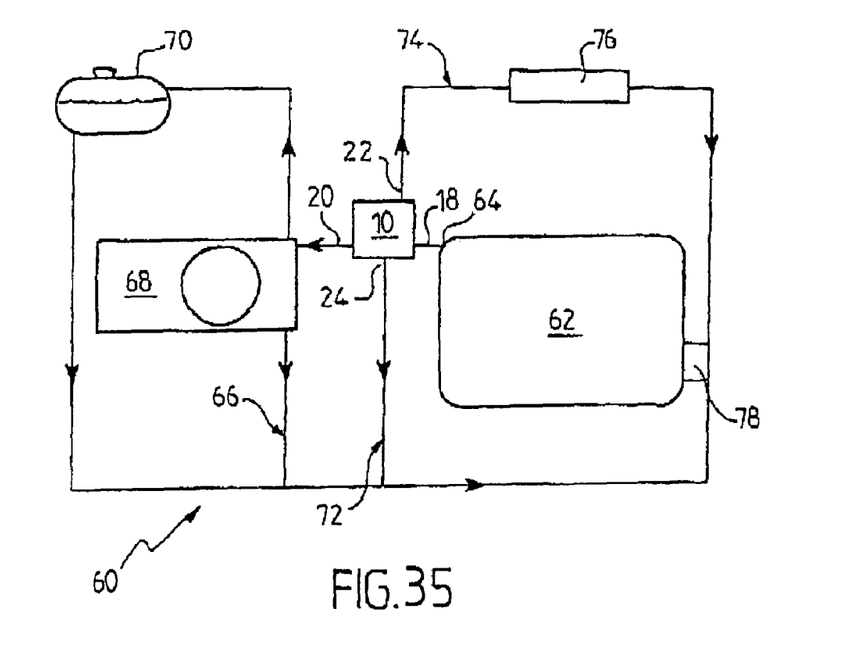
FIG. 35 depicts a motor vehicle engine cooling circuit equipped with a control or regulating valve according to the invention.
Figure 36:
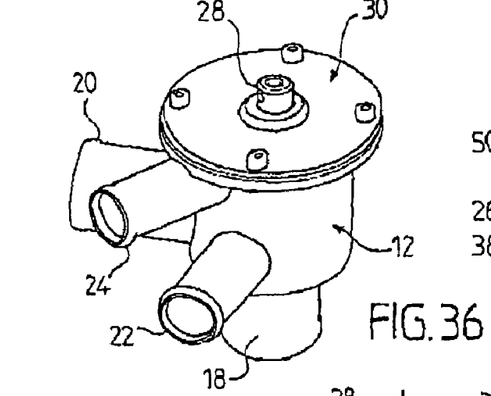
FIG. 36 is a perspective view of a control valve, of the three-way type, according to another embodiment of the invention.
Figure 37:
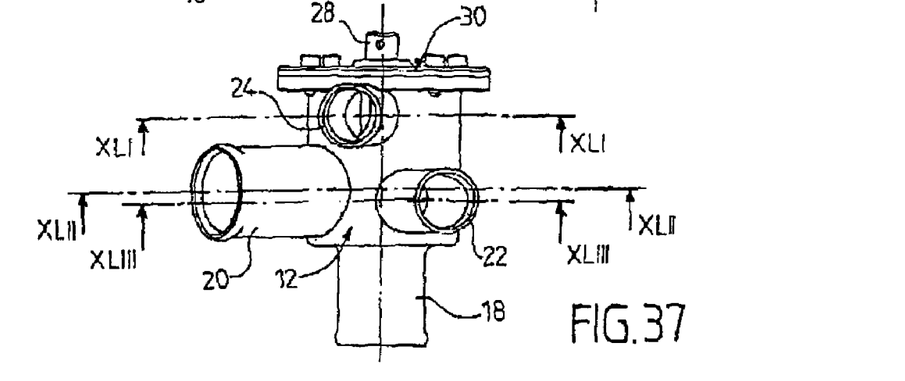
FIG. 37 is a side view of the valve of FIG. 36.
Figure 38:
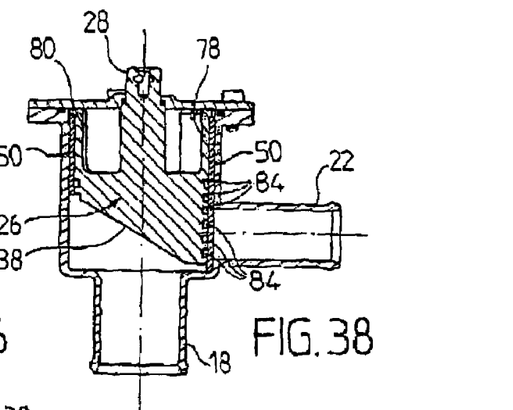
FIGS. 38, 39 and 40 are views in radial section of the valve of FIGS. 36 and 37, passing respectively through the axes of the three outlet nozzles.
Figure 39:
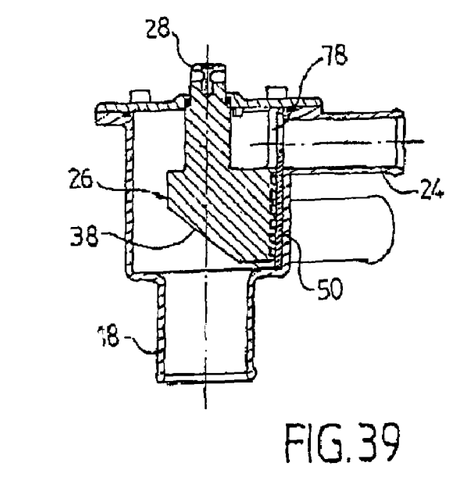
Figure 40:
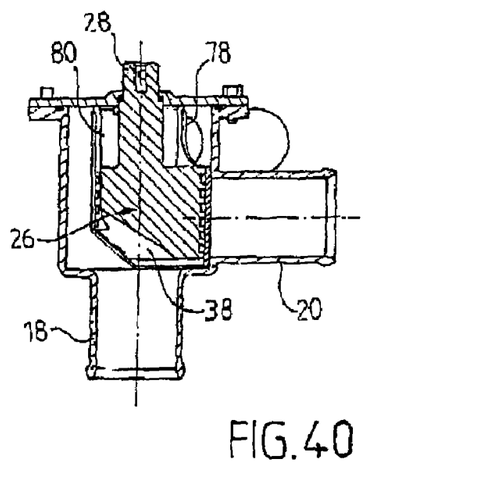
Figures 41, 42, 43:
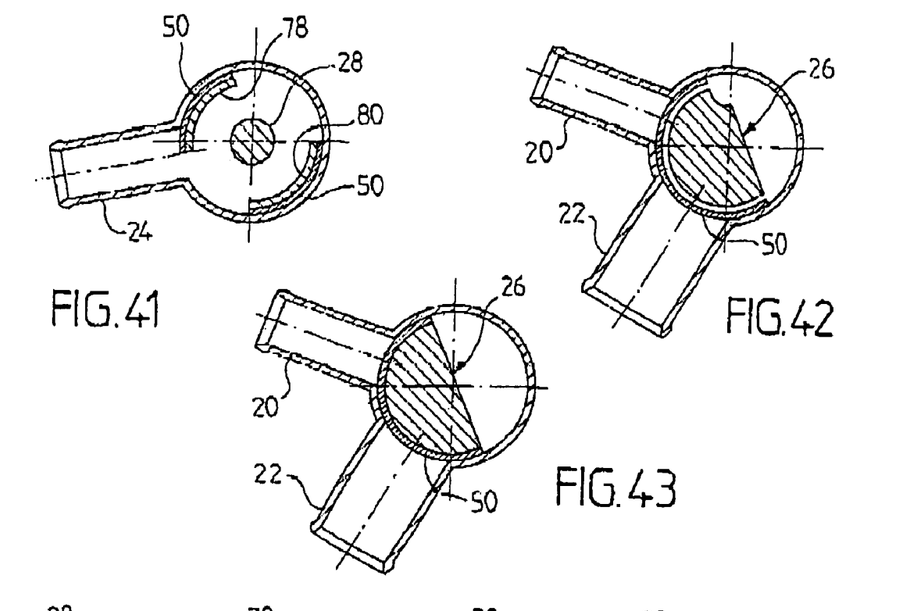
FIGS. 41, 42 and 43 are views in section on XLI-XLI, XLII-XLII and XLIII-XLIII of FIG. 37.

Reference is now made to FIG. 35 which shows a circuit 60 for cooling the engine 62 of a motor vehicle. The circuit 60 has, passing through it, a coolant, typically water to which an antifreeze is added, which flows under the action of a pump 78. The fluid is heated by the engine, leaves the latter via an outlet 64 connected to the inlet nozzle 18 of a control valve 10 of the type described hereinabove. This valve comprises three outlet nozzles 20, 22 and 24 which are connected to three branches of the circuit. This circuit comprises a first branch 66 which contains a cooling radiator 68 and an expansion vessel 70, a branch 72 which forms a bypass bypassing the cooling radiator 68 and a branch 74 which contains a unit heater 76 used to heat the cabin of the vehicle. The nozzle 20 is connected to the branch 66 (radiator), the nozzle 22 to the branch 74 (unit heater) and the nozzle 24 to the branch 72 (bypass).

The valve thus makes it possible to have independent control over the flow rates of fluid in the aforementioned branches, so as to optimize the engine temperature and the heating of the cabin.

In particular, when the engine is being started from cold, it allows the fluid to be circulated through the bypass branch 72 without passing the radiator 68. During this start phase it is also possible to cause some or all of the fluid flow rate to pass into the unit heater 76, if heating is desired.

When the temperature of the fluid has reached or exceeded a given threshold value, the fluid passes through the radiator 68 and avoids the bypass 72. Furthermore, depending on whether or not heating is desired, some of the fluid may or may not pass through the unit heater 76.

The control valve in FIGS. 36 to 47 can be likened to those described before, the common elements being denoted by the same numerical references.

The outlet nozzles 20 and 22 together form an angle of close to 90°, while the outlet nozzle 24 extends between the nozzles 20 and 22. In addition, the outlet nozzle 24, which is the one closest to the cover 30, has a diameter greater than the diameter in the preceding embodiments. As a result, it would normally be necessary to increase the diameter of the valve body. To avoid that, the adjusting member 26 comprises, at the opposite end to the truncated end 38, two roughly diametrically opposed cylindrical wall portions 78 and 80 for controlling the outlet nozzle 24.

These two wall portions 78 and 80 extend the adjusting member 26 in the direction away from the truncated end 38 and are produced in the form of two thin webs of material extending some distance from the stem 28 of the adjusting member. It can be seen, particularly from FIGS. 39 to 41, how these two wall portions allow access to the outlet nozzle 24 to be closed or opened according to the angular position of the adjusting member.

Figure 44:
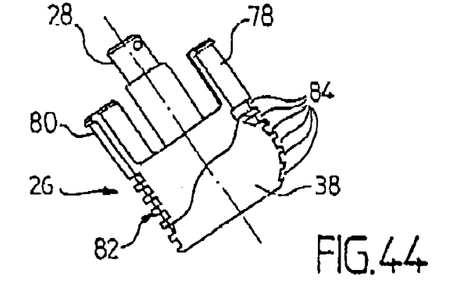
FIG. 44 is a side view of the adjusting member of the valve of FIGS. 36 to 43.
Figure 45:
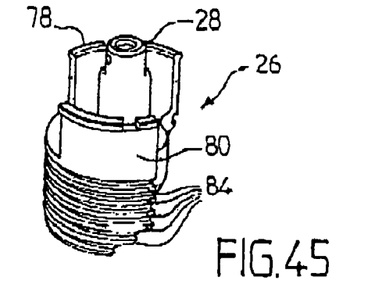
FIG. 45 is a perspective view of the adjusting member of FIG. 44.
Figure 46:
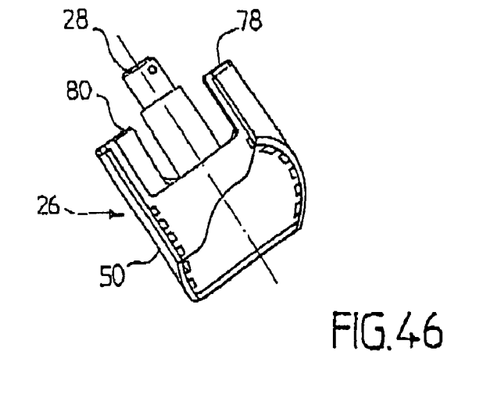
FIGS. 46 and 47 are views similar to FIGS. 44 and 45 respectively, the adjusting member being equipped with a split ring.
Figure 47:
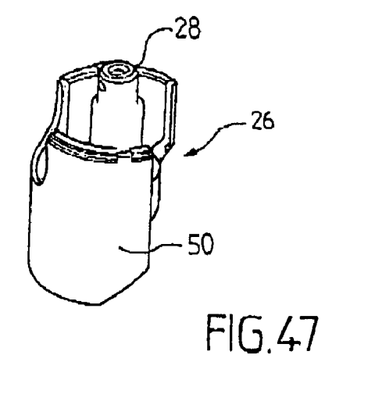

In this embodiment, the adjusting member 26 comprises a peripheral region 82 which is equipped with circular grooves 84 (see FIGS. 44 and 45 in particular). As in the preceding embodiments, the adjusting member 26 takes a split ring 50. The latter covers both the peripheral region 82 and the two wall portions 78 and 80. The function of these circular grooves 84 is to press the split ring 50 firmly against the interior wall of the valve body under a pressure difference, making it possible to ensure good sealing during operation.

The valve of FIGS. 36 to 47 finds a particular use in a circuit of the type depicted in FIG. 35. In this case, the nozzle 20 is connected to the branch 66 (radiator), the nozzle 22 to the branch 74 (unit heater) and the nozzle 24 to the branch 72 (bypass).

Figure 48:
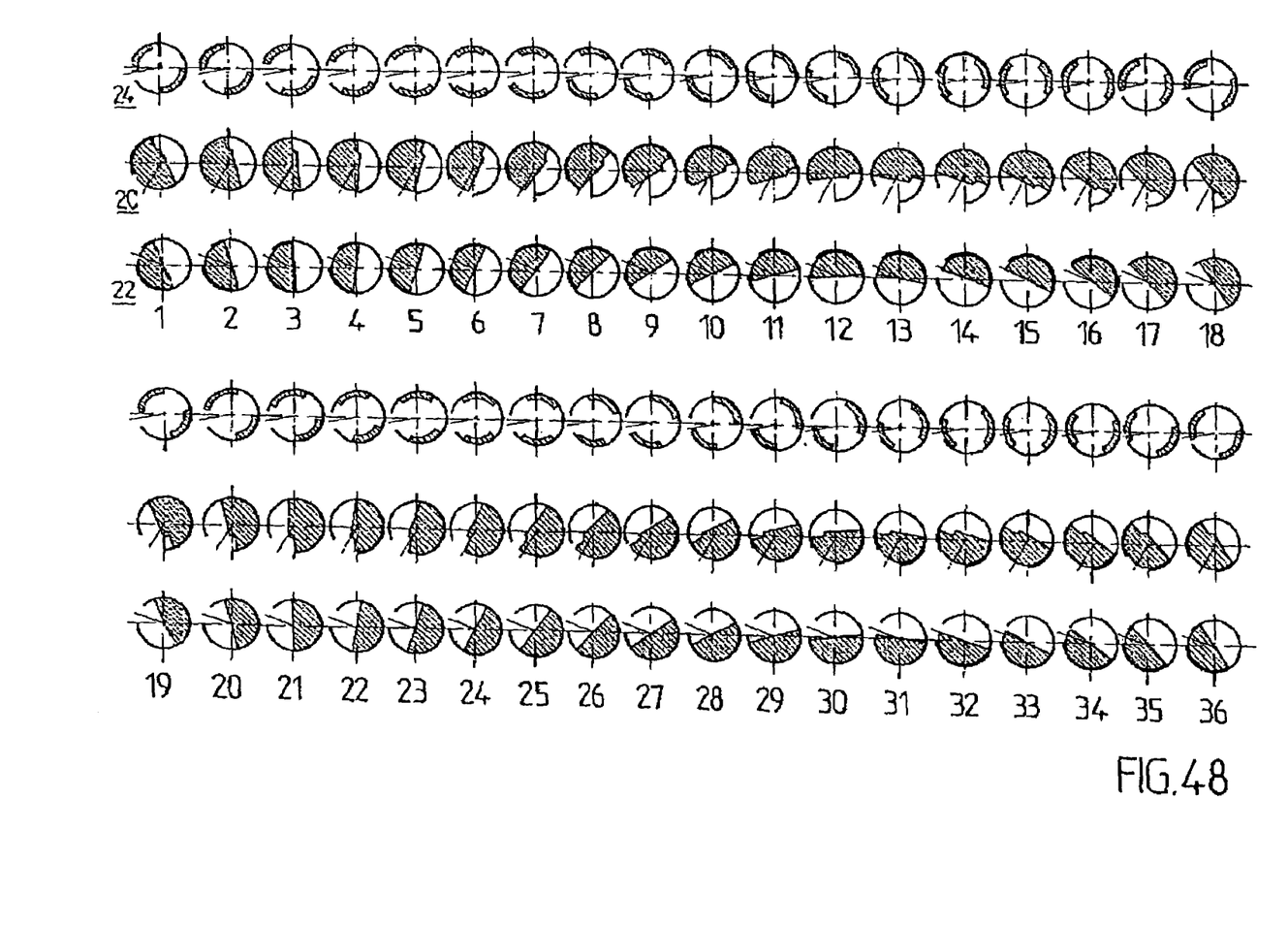
FIG. 48 shows, in each instance, three different sectional views of the valve of FIGS. 36 to 43 for angular positions of the adjusting member, numbered from 1 to 36, which follow on from one another in ten-degree increments in the clockwise direction.

Reference is now made to FIG. 48 which shows various successive positions of the adjusting member, numbered from 1 to 36, each one respectively at the three outlet nozzles 20, 22 and 24. In the example, these positions are obtained by successive rotations through 10 degrees in the clockwise direction of the adjusting member within the valve body. It can thus be seen that the various outlet nozzles can be opened or closed in accordance with a defined law, and that this can be done progressively.

Figure 49:
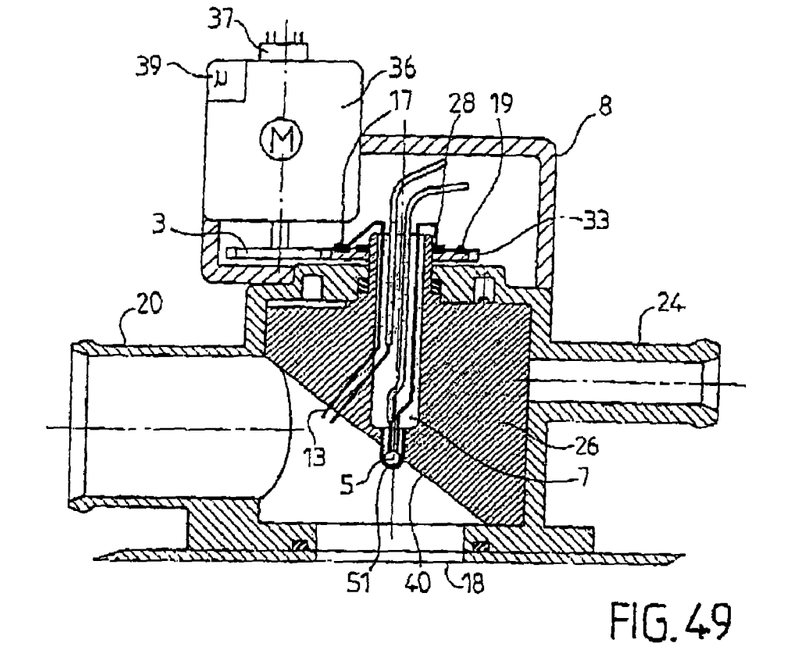
FIGS. 49 and 50 depict a control valve with built-in sensors.
Figure 50:
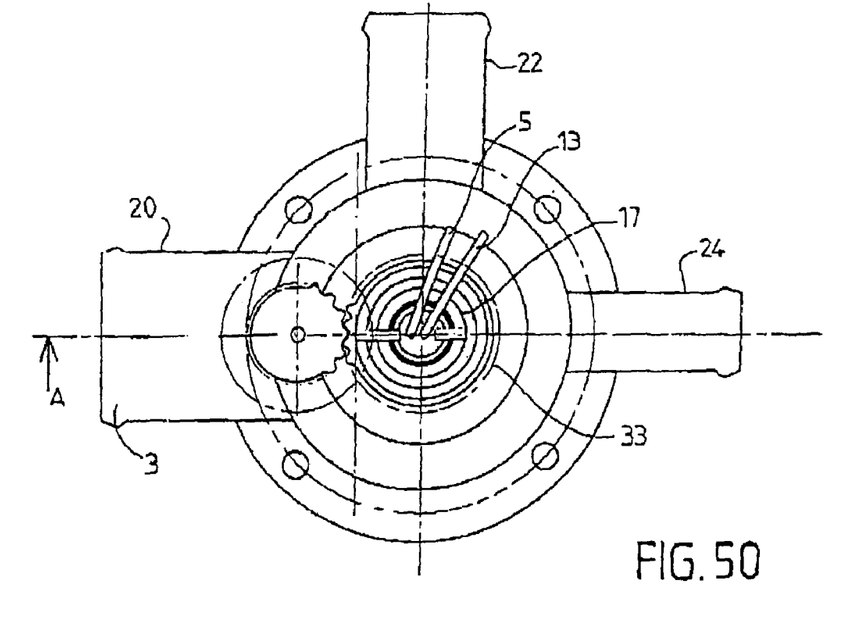

With reference to FIGS. 49 and 50 it is possible to incorporate sensors into the control valve according to the invention. The control valve does actually allow sensors to be incorporated into the adjusting member 26 rotating about the axis XX. All kinds of sensors capable of measuring parameters relating to the engine cooling circuit and, for example:
  a coolant temperature sensor,
  a sensor sensing the temperature of an at-risk component on the valve actuator,
  a pressure sensor sensing the pressure in the cooling circuit to anticipate any overheating of the engine and to trigger a degraded mode for the valve, the fan and the pump and then of the engine if necessary,
  a sensor that senses the presence of air in the coolant, etc., may be sited in the adjusting member 26.

FIG. 49 illustrates the incorporation of sensors into an adjusting member with a truncated end 38. A temperature sensor sensing the temperature of coolant 5 and a sensor sensing the presence of air in the coolant 13 are incorporated into the adjusting member 26. These sensors are made up of two electrodes. A cylindrical duct 7 is machined in the adjusting member 26 to house the sensors 13 and 5.

The cylindrical duct 7 comprises a brass end 51 in contact with the coolant, regardless of the position of the adjusting member. The temperature sensor 5 is introduced into the cylindrical duct in such a way that its lower end is housed in the brass end. Thus, the temperature sensor may measure the temperature of the coolant even when the adjusting member is rotating about the axis XX.

There are various alternative forms of embodiment for incorporating the sensors. The adjusting member 26 is shaped to be able to house the sensors, taking account in particular of the nature of the sensor and of its shape. Incorporation of the sensors 5 and 13 is given by way of nonlimiting example. Other forms of incorporation are possible.

For example, the sensor sensing the presence of air in the coolant 13 comprises a first part introduced into the cylindrical duct while its lower end passes through the adjusting member 26 as far as its truncated end 28, on the outside of the cylindrical duct, to be in contact with the coolant.

In all the alternative forms of embodiment, the lower ends of the sensors pass through the lower end of the adjusting member 26 which faces toward the end wall 14. In this way, the sensor 13 can also be in contact with the coolant independently of the angular position of the adjusting member. It can then measure values relating to the presence of air in the coolant.

The values measured by the sensors are then transmitted to the outside of the valve for processing intended to monitor the cooling circuit and to diagnose any malfunctions that may occur.

Reference is now made to FIG. 50 which is a view from above of the valve depicted in FIG. 49. In this figure, the drive wheel 33 of the reduction gearbox 3 comprises circular tracks 17. The circular tracks are therefore also able to move. As an alternative, the circular tracks can be arranged on another moving part of the valve separate from the drive wheel, for example on a printed circuit mounted in parallel with the drive wheel.

Advantageously, the upper ends of the sensors are connected to these circular tracks by electrical contact to allow the relative movement of the adjusting member with respect to the valve body 12 and prevent the wires from twisting. This connection allows the sensors to transmit the measured values to the circular tracks.

The circular tracks are connected to plugs of the brush type 19, placed on a fixed part of the valve, for example on the printed circuit that accommodates the microprocessor 39 that operates the valve or on the protective casing 8 protecting the external components of the valve such as the reduction gearbox 3 or the drive wheel 33. These plugs transmit the information received from the circular tracks to a single connector 37. Given the grouping of the upper ends of the sensors, there is no longer actually any need to use numerous connectors for conveying the measured values to the microprocessor and/or to the computer.

The connector 37 then transmits the information relating to the values measured by the sensors to the microprocessor which operates the valve (power supply, control and diagnostics signal) and/or to the vehicle computer, supplying it with the data needed for engine mapping, such as the coolant temperature.

As an alternative, a decision may be made to locate the circular tracks 17 on one of the fixed parts of the valve and the plugs 19 on one of the moving parts of the valve.

Furthermore, the circular tracks may be replaced by other information transmitting means capable of transmitting data from the upper ends of the sensors to the connector, such as contactless sensors for example, particularly Hall-effect, optical or magneto-resistive sensors.

Incorporating the sensors inside the valve, according to the invention, allows the operation of the cooling circuit to be monitored and breakdowns to be diagnosed as and when they occur. In a degraded mode, it also allows the operation of the valve to be adjusted. The valve can thus by itself regulate the engine temperature and diagnose any breakdowns of actuators (fan, pump, valve, leak of fluid, etc.) at the computer before the engine overheats.

Incorporating the sensors into the control valve according to the invention guarantees better prevention and gives the engine better dependability. Furthermore, it makes it possible to reduce the number of parts and the cost of the function of regulating the cooling circuit.

Of course, the valve of the invention can be embodied in many alternative forms. It is not restricted to a three-way valve as in the embodiments described above. Nor is it limited to an application to a motor vehicle engine cooling circuit.

Likewise, it is possible to conceive of an embodiment in which the inlets and the outlets are reversed on the valve body. Indeed, within the meaning of the invention, the ideas of "fluid inlet" and "fluid outlet" are defined with respect to the position of the valve in the cooling circuit. In other embodiments, for example when the valve is placed on the inlet side of the engine (62) in the cooling circuit, the ideas of "fluid inlet" and "fluid outlet" are reversed and, in this case, the nozzle 18 is a fluid outlet and the nozzles 20, 22 and 24 are fluid inlet nozzles.

The invention claimed is:

1. A control valve (10) for a fluid circulation circuit, comprising:
    a body (12) which is equipped with at least one fluid inlet (18) and at least two fluid outlets (20, 22, 24); and
    an adjusting member (38) within the body able to rotate inside the body about an axis (X-X) of rotation;
    wherein: the body comprises an end wall (14) into which the fluid inlet opens and a side wall (16) into which the fluid outlets (20, 22, 24) open, and wherein the adjusting member (38) comprises a shaped part; the body (12) is cylindrical in shape and houses the adjusting member; the side wall (16) is a cylindrical wall, and the shaped part (40) of the adjusting member (38) is a truncated end facing toward the end wall; and wherein the adjusting member comprises, at the opposite end to the truncated end, two roughly diametrically opposed cylindrical wall portions for controlling one of the fluid outlets.

2. The control valve as claimed in claim 1, wherein the truncated end comprises a generally flat face which, forms a chosen angle of close to 45° to an axis of rotation (X-X).

3. The control valve as claimed in claim 2, wherein at least one of the fluid outlets is a radial nozzle.

4. The control valve as claimed in claim 2, wherein at least one of the fluid outlets is a tangential nozzle.

5. The control valve as claimed in claim 2 which comprises three fluid outlets.

6. The control valve as claimed in claim 1, wherein at least one of the fluid outlets is a radial nozzle.

7. The control valve as claimed in claim 6, wherein the adjusting member is equipped with a sealing shoe.

8. The control valve as claimed in claim 1, wherein at least one of the fluid outlets is a tangential nozzle.

9. The control valve as claimed in claim 8, wherein the adjusting member is equipped with a sealing shoe.

10. The control valve as claimed in claim 1 which comprises three fluid outlets.

11. The control valve as claimed in claim 10, wherein the adjusting member is equipped with a sealing shoe.

12. The control valve as claimed in claim 1, wherein the adjusting member has a projecting lug and is covered with a split ring which rotates together with the adjacent member.

13. The control valve as claimed in claim 12, wherein the split ring is made of a material with a low coefficient of friction.

14. The control valve as claimed in claim 13, wherein the split ring has an outside diameter slightly greater than the inside diameter of the valve body prior to mounting and an inside diameter slightly greater than the diameter of the adjusting member after mounting.

15. The control valve as claimed in claim 12, wherein the adjusting member is equipped with circular grooves and the split ring covers a region of the adjusting member equipped with the circular grooves.

16. The control valve as claimed in claim 12, wherein the adjusting member is equipped with a sealing shoe.

17. The control valve as claimed in claim 1, wherein the truncated end of the adjusting member comprises a duct in the shape of an arc of a circle.

18. The control valve as claimed in claim 1, wherein the adjusting member is equipped with a sealing shoe.

19. The control valve as claimed in claim 18, wherein the sealing shoe is mounted on a spring.

20. The control valve as claimed in claim 1 comprising a drive means able to drive the adjusting member into chosen angular positions with respect to the valve body.

21. The control valve as claimed in claim 20, wherein the drive means is a reduction gearbox having a drive wheel.

22. The control valve as claimed in one of claim 21, wherein circular tracks are situated on a moving part of the valve and the moving part of the valve is the drive wheel of the drive means.

23. The control valve as claimed in claim 20, wherein the valve comprises a microprocessor and/or a computer for operating the drive means.

24. The control valve as claimed in claim 23 further comprising an information transmitting means for transmitting values measured by the sensor to a microprocessor and/or a computer and a connector connected to the information transmitting means wherein the sensor has a first and a second end, and the second end of the sensor passes the upper end of the valve and is connected to the information transmitting means.

25. The control valve as claimed in claim 1, wherein the adjusting member comprises at least one internal sensor for measuring values relating to the operation of the fluid circulation circuit.

26. The control valve as claimed in claim 1, wherein the side wall (16) is a cylindrical wall, and the shaped part (40) of the adjusting member is a truncated end facing toward the end wall.

27. The control valve as claimed in claim 26, wherein the internal sensor is a sensor that senses the presence of air in the circuit.

28. The control valve as claimed in claim 26, wherein the adjusting member comprises a machined duct that extends over the entire length of the adjusting member and houses the sensor.

29. The control valve as claimed in claim 26, wherein the sensor has a first end and a second end, and the first end of the sensor passes through the lower end of the adjusting member that faces the end wall in such a way so as to be in contact with the fluid and to take measurements.

30. The control valve as claimed in claim 29, wherein there is more than one sensor and the sensors are temperature sensors.

31. The control valve as claimed in claim 30, wherein the machined duct comprises a lower end made of brass which houses the first end of the sensor and is in contact with the fluid.

32. The control valve as claimed in claim 29, wherein the second end of the sensor passes through the upper end of the valve and is connected to an information transmitting means for transmitting values measured by the sensors to a microprocessor and/or to a computer.

33. The control valve as claimed in claim 32, wherein the information transmitting means comprise circular electrical-contact tracks.

34. The control valve as claimed in claim 33, wherein the information transmitting means comprise plugs connected to the circular tracks for transmitting the values originating from the sensors.

35. The control valve as claimed in claim 34, wherein the circular tracks are situated on a moving part of the valve and wherein the plugs are situated on a fixed part of the valve.

36. The control valve as claimed in claim 34, wherein the circular tracks are situated on a fixed part of the valve and wherein the plugs are situated on a moving part of the valve.

37. A fluid circulation circuit with branches which comprises a control valve as claimed in claim 1, the fluid inlet of which is connected to a fluid source and the fluid outlets of which are connected respectively to branches of the circuit.

38. The fluid circulation circuit as claimed in claim 37, wherein the fluid used therein is a coolant and the fluid circulation circuit is a cooling circuit for cooling the engine of a motor vehicle which comprises an engine, a cooling radiator, a cabin, a unit heater for heating the cabin and a first, second and third branch of the circuit.

39. The fluid circulation circuit as claimed in claim 38, further comprising a circulating pump to pump the coolant in the circuit, wherein the control valve is a three way valve and the valve has three fluid outlets, wherein the fluid inlet is connected to a coolant inlet originating from the engine, and the three fluid outlets are connected respectively to a first branch of the circuit which contains the cooling radiator, the second branch of the circuit which constitutes a bypass of the cooling radiator, and the third branch of the circuit which contains the unit heater for heating the cabin.

* * * * *